United States Patent [19]

Nagano

[11] Patent Number: 5,201,236
[45] Date of Patent: Apr. 13, 1993

[54] SYSTEM FOR AMPLIFYING MANUAL OPERATING FORCE TRANSMITTED TO A FUNCTIONAL DEVICE OF A BICYCLE

[75] Inventor: Masashi Nagano, Izumi, Japan

[73] Assignee: Shimano, Inc., Osaka, Japan

[21] Appl. No.: 778,374

[22] Filed: Oct. 17, 1991

[30] Foreign Application Priority Data

Oct. 20, 1990 [JP] Japan .................................. 2-282643
Oct. 15, 1991 [JP] Japan .................................. 3-266036

[51] Int. Cl.⁵ .......................... G05G 7/00; B62L 3/02; F16H 59/04
[52] U.S. Cl. ............................. 74/388 R; 74/473 R; 74/500.5; 74/502.2; 188/24.14; 188/82.84; 474/80; 474/82
[58] Field of Search ............. 74/388 R, 473 R, 500.6, 74/501.6, 502.2; 188/24.14, 82.84; 474/80, 82

[56] References Cited

U.S. PATENT DOCUMENTS

| | | | |
|---|---|---|---|
| 2,633,934 | 4/1953 | Champoux | 188/5 |
| 2,909,069 | 10/1959 | MacDonald | 74/388 R X |
| 3,468,184 | 9/1969 | Maschmann | 74/500.5 X |
| 3,860,094 | 1/1975 | Breton | 188/24.14 |
| 4,224,832 | 9/1980 | Prohaska et al. | 74/388 R |
| 4,483,682 | 11/1984 | Cavil et al. | 74/388 R X |
| 4,676,118 | 6/1987 | Leiter | 474/82 X |

FOREIGN PATENT DOCUMENTS

| | | |
|---|---|---|
| 269547 | 6/1988 | European Pat. Off. . |
| 827445 | 1/1938 | France . |
| 603577 | 6/1948 | United Kingdom . |
| 2134199 | 8/1984 | United Kingdom . |

OTHER PUBLICATIONS

Suntour Self Energizing Brake.

*Primary Examiner*—Allan D. Herrmann
*Attorney, Agent, or Firm*—Dickstein, Shapiro & Morin

[57] ABSTRACT

A roller intake mechanism having an operating force amplifying device includes a cam (7) rotatable about an axis of an axle a plurality of rollers (8) displaceable with rotation of the cam, a roller case (9) for displaceably retaining the rollers, a brake drum (5) extending from a wheel hub (2), and a brake shoe (10) disposed between the rollers and brake drum for contacting the brake drum with displacement of the rollers. The amplifying device is formed as a clamping ring (18) having one end thereof operatively connected to a brake lever (100) through an interlocking wire (150), and the other end operatively connected to the cam. An intermediate portion of the ring is wound around a peripheral surface of the brake drum. Based on a primary operating force applied from the brake lever, the clamping ring clamps the brake drum, which produces a frictional force for allowing the clamping ring to take power from the brake drum, i.e. the wheel hub. The power thus taken is used as an amplified or supplemented operating force for operating the cam of the roller brake mechanism. The cam under the amplified operating force presses the brake shoe upon the brake drum. Thus the brake is operable by a great force obtained by taking power from the wheel hub, which allows the primary operating force to be small.

20 Claims, 19 Drawing Sheets

SYSTEM FOR AMPLIFYING MANUAL OPERATING FORCE TRANSMITTED TO A FUNCTIONAL DEVICE OF A BICYCLE

BACKGROUND OF THE INVENTION

1. Field of the Invention

The present invention related to a bicycle having a functional device operable by a force transmitted from a manual control device, and more particularly to a system for amplifying the above operating force for transmission to the functional device, e.g. a braking device or a change speed device.

2. Description of the Related Art

Conventionally, the functional device of a bicycle and the control device such as a control lever for operating the functional device are interconnected directly through a wire or the like. An operating force produced by the control lever is transmitted as it is to the functional device through the wire.

In the conventional construction, however, the operating force transmitted to the functional device depends solely on a force manually applied by the cyclist to the control lever. To apply a strong force to a braking device, for example, the cyclist must pull a brake lever hard against elasticity of a brake shoe or an urging force of a return spring included in the braking device. In operating a derailleur to change speed, a sufficient operating force must be applied to a change lever to overcome a resistance occurring with shifting of a chain from one gear to another and an urging force of a return spring included in the derailleur. Thus, a strong operating force must be applied manually to operate such a functional device, which is a considerable burden on the cyclist.

An improvement in the functional device per se has been proposed as a measure for solving this problem, in which the brake shoe is directly engageable with the rim of a wheel as in what is known as a leading cantilever brake. According to such a construction, an operating force relies only on positional relations between the brake shoe itself acting as a final active member of the functional device and the rim acting as a passive member. When, for some reason, the coefficient of friction between the brake shoe and rim exceeds a certain value, the brake shoe applies an increased braking force independently of an operating force controlled by the cyclist, or against the cyclist's will, and ultimately could lock the wheel.

SUMMARY OF THE INVENTION

The object of the present invention is to provide an improved system capable of producing a strong secondary operating force from a weak primary operating force to operate a functional device of a bicycle, and fully controlling the functional device by means of a control device.

The above object is fulfilled, according to the present invention, by an operating force amplifying device for taking power from a drive element of a bicycle based on an operating force applied from a manual control device, and transmitting the power taken to a functional device as an operating force therefor.

In this entirely novel system for a bicycle, as schematically shown in FIG. 1, a primary operating force applied from a control device such as a control lever causes the amplifying device to take power from a drive element such as a rotating front or rear wheel or a crank shaft turned by the feet of a cyclist. The power thus taken out is supplied to a functional device such as a brake device or a change speed device as an amplified or supplemented operating force. That is, the functional device may be operated with an operating force reinforced by an amount corresponding to the amplified or supplemented force secured by taking the power out of the drive element. Consequently, the manual control device may produce only a small primary operating force. The power takeout from the drive element results in little or no burden on the cyclist since the power of the wheel or crank shaft is adequately obtained from the strength of cyclist's legs or sloping roads which readily provide great energy. Moreover, since power is taken from the drive element based on the primary operating force, the power takeout may be controlled by controlling the primary operating force input to the operating force amplifying device. As a result, the cyclist has full control of the operating force applied to the functional device.

The above operating force amplifying and transmitting system may be applied to a brake control system with advantage. In this case, the bicycle may be braked with a strong braking force only by lightly pulling a brake lever. Braking of the bicycle may be canceled without locking the wheel by releasing the brake lever. Such brake control systems will be set out in the preferred embodiments and appended claims to follow.

Further, the operating force amplifying and transmitting system according to the present invention is applicable, with advantage, to a control system of a change speed device or derailleur. However, where this system is used to supply an operating force to a derailleur, it is necessary to provide means to retain a chain guide of the derailleur in predetermined positions. If, for example, a retaining force therefor relies on the power taken through a frictional force from the crank shaft or the like acting as the drive element, it is undesirable in that the frictional force presents a constant obstacle to rotation of the crank shaft. To solve this problem, an operating force amplifying device used for change speed purposes according to the present invention includes an operating force accumulator for temporarily accumulating the power taken out of the drive element. While a preferred form of this accumulator will be apparent from the preferred embodiments and appended claims, the power stored in the accumulator compensates for a decrease in the operating force supplied to the functional device when the primary operating force is slightly relaxed to stop the power takeout. When the primary operating force is decreased by an amount exceeding a predetermined amount, naturally the amplified operating force for the functional device will become lost to complete a change speed operation.

The amplifying and transmitting system according to the present invention may include a bypassing device for transmitting the operating force from the manual control device directly to the functional device, bypassing the operating force amplifying device. Such a system assures safety in the event that the operating force transmission is broken by malfunctioning of the amplifying device or other causes.

In a preferred embodiment of the present invention, a one-way clutch device is disposed between the drive element and a power takeout section of the amplifying device in order to avoid an inconvenience that negative power is taken out as a result of reverse rotation of the drive element, e.g. backward rotation of the wheels. This one-way clutch device allows the power takeout section to take from the drive element only the power acting in a direction corresponding to forward drive of the bicycle.

Other features and advantages of the present invention will be apparent from the following description to be had with reference to the drawings, and from the appended dependent claims.

DETAILED DESCRIPTION OF THE PREFERRED EMBODIMENTS

Embodiments of the present invention will be described hereinafter, in which the invention is applied to brake control systems first, and then to change speed control systems.

Figure 1:
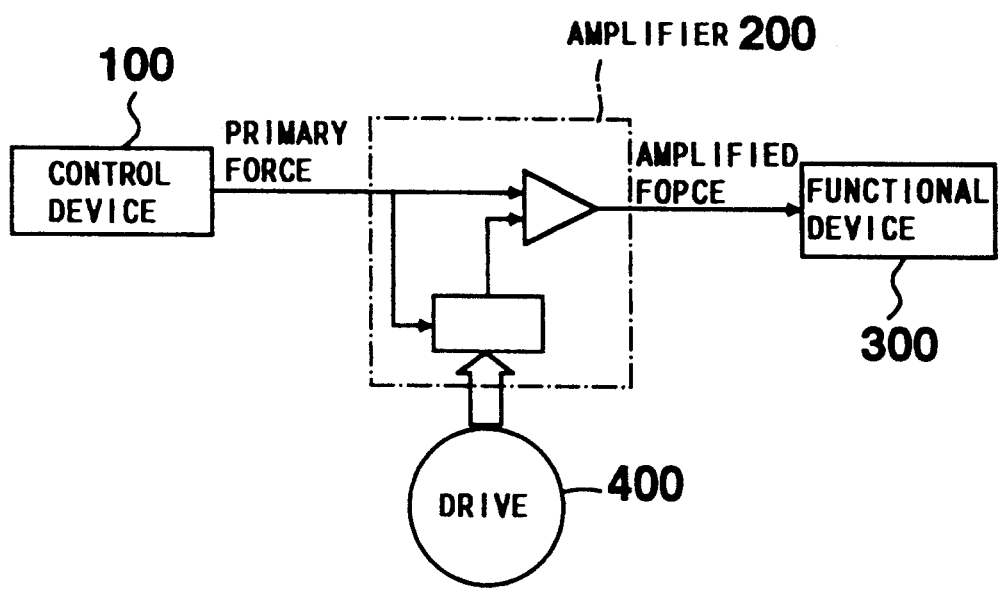
FIG. 1 is a schematic view showing the concept of an operating force amplifying and transmitting system according to the present invention.
Figure 2:
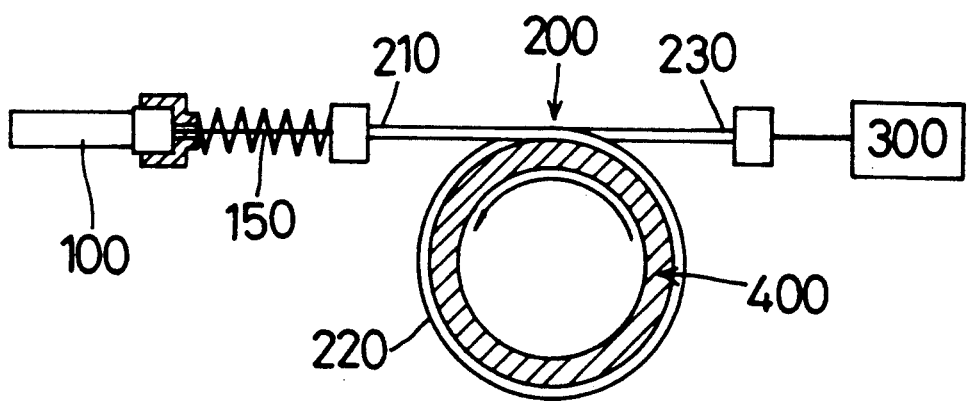
FIG. 2 is a view showing the principle of an operating force amplifying and transmitting system in a first embodiment of the present invention.

FIG. 2 schematically shows the principle of a first embodiment in which the present invention is applied to a brake control system. In FIG. 2, an operating force amplifying device 200 includes an input section 210, a power takeout section 220 and an output section 230, all formed of a continuous belt capable of transmitting a tensile and compressive force. The power takeout section 220, by an increase in its own tension, is placed in frictional engagement with a rotary drive element 400 to take power therefrom, and transmits a resulting amplified operating force to a brake assembly 300.

The first embodiment of the present invention will be described in detail next with reference to FIGS. 3 through 6. As shown in the drawings, the functional device 300 is a bicycle brake assembly 1 mounted on a rear wheel hub 2, and the control device 100 is a brake lever of the bicycle. The operating force amplifying device 200 is disposed between the control device 100 and functional device 300. The hub 2 is rotatable about an axle 4 fixed to a bicycle frame 3, with a cylindrical brake drum 5 formed integral with and projecting from one end of the hub 2.

As shown in FIGS. 3 through 6, the brake assembly 1 includes a stationary element 6 fixed to the frame 3, a cam 7 interposed between the axle 4 and brake drum 5, a plurality of rollers 8 resting on peripheral surfaces of the cam 7, a roller case 9 having projections extending into spaces between adjacent rollers 8 and retaining the rollers 8 in place, and a brake shoe 10 interposed between the rollers 8 and brake drum 5. Further, a brake cover 11 is provided to act as a side wall of the brake assembly 1, i.e. to close an opening of the brake drum 5. The brake shoe 10 is divided into three parts arranged around the axle 4 and constantly urged by an annular brake spring 12 away from the brake drum 5. The cam 7 is rotatable around the axle 4 and, when rotated counterclockwise in FIG. 6, pushes the rollers 8 radially outwardly, whereby the brake shoe 10 presses upon an inside surface of the brake drum 5 against the force of brake spring 12 to brake the bicycle. The brake shoe 10 and roller case 9 are fitted to the stationary element 6 not to be rotatable relative thereto.

Figure 3:
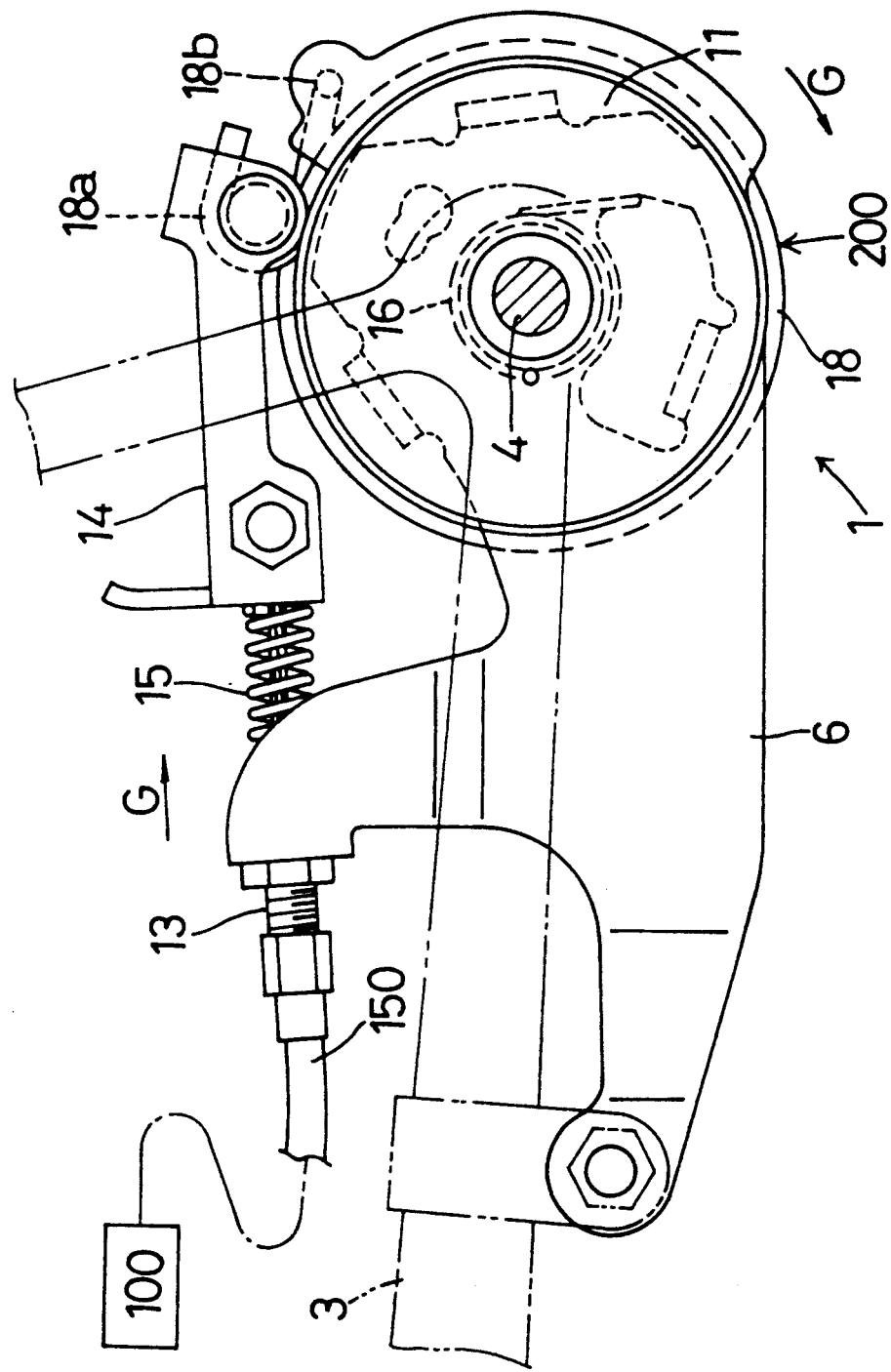
FIG. 3 is a side view of a brake assembly having an operating force amplifying device in the first embodiment.
Figure 4:
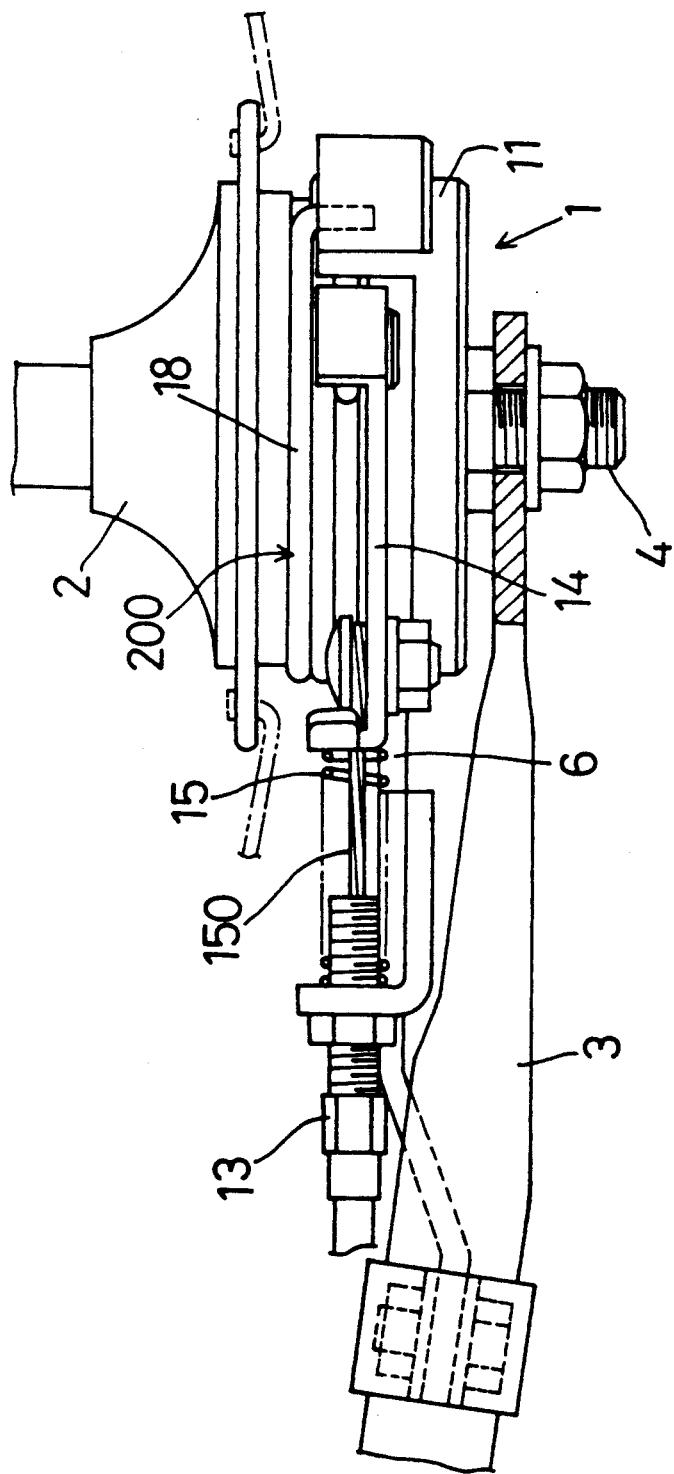
FIG. 4 is a plan view of the brake assembly in the first embodiment.
Figure 5:
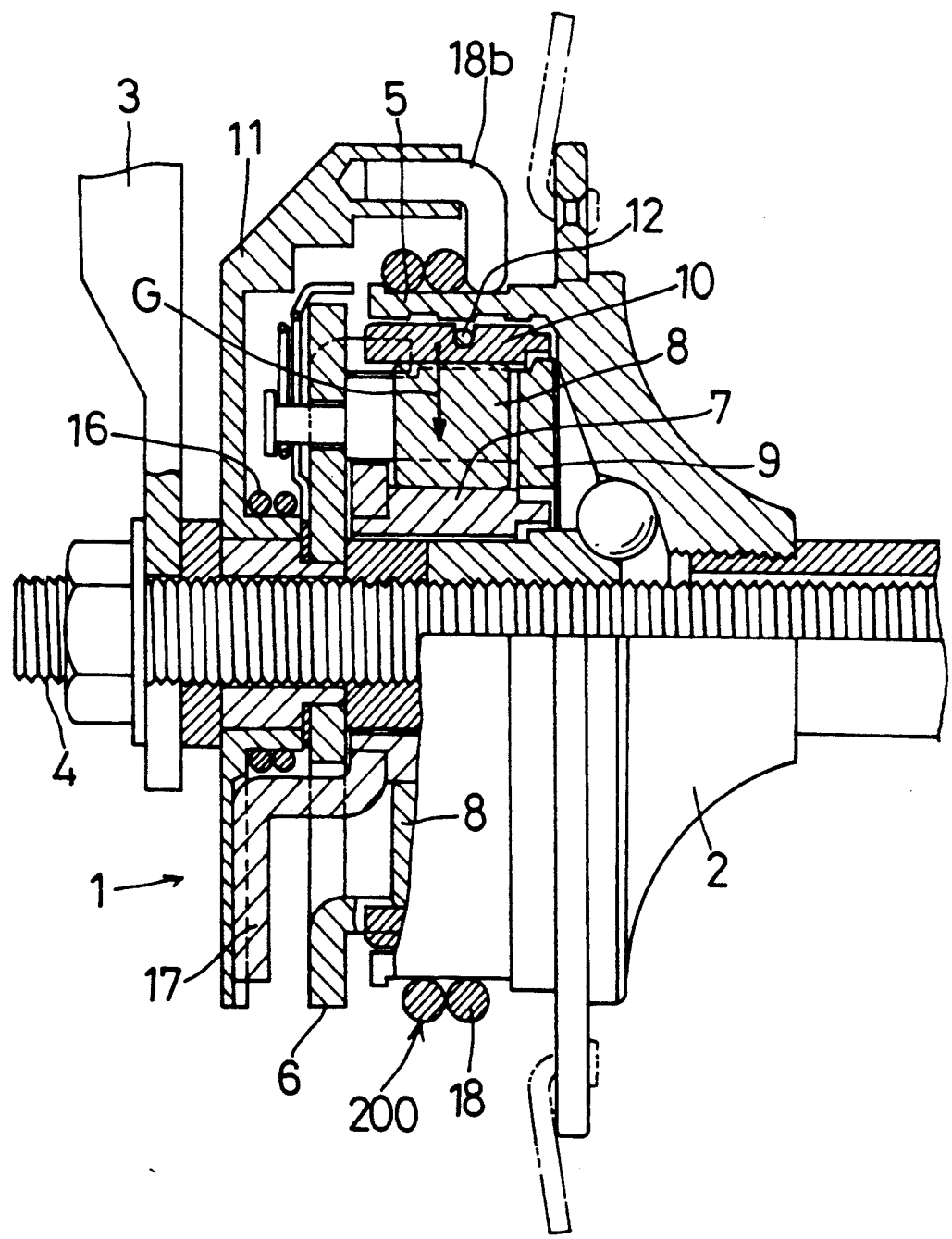
FIG. 5 is a front view, partly in section taken on a plane passing through an axle, of the brake assembly in the first embodiment.
Figure 6:
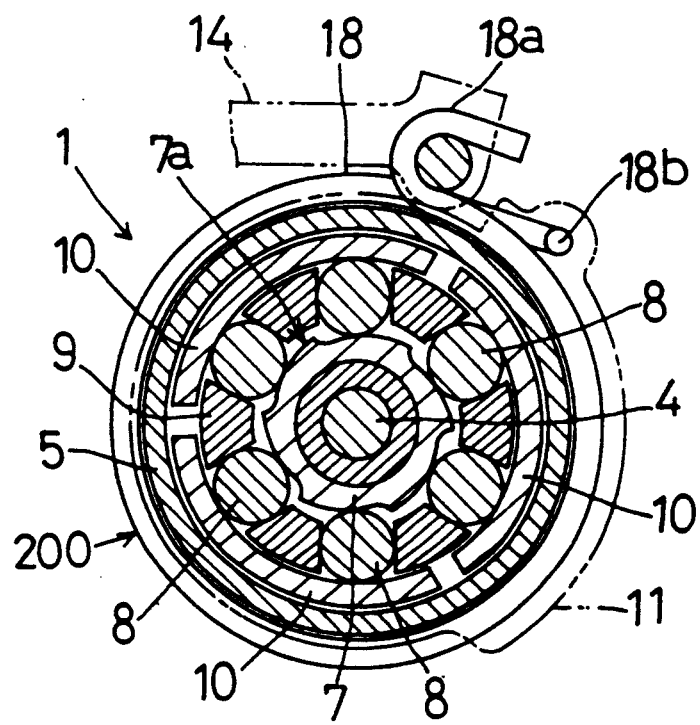
FIG. 6 is a section taken on a plane perpendicular to the axle and showing a brake drum region in the first embodiment.

The stationary element 6 includes an outer bearing 13 for receiving an end of an outer sleeve of an inputting release wire 150 extending from the brake lever. The release wire 150 has an end of an inner wire connected to a link 14. A link spring 15 formed of a compression coil spring is mounted between the outer bearing 13 and link 14. The brake cover 11 is rotatable around the axle 4, urged clockwise by a cover spring 16 formed of a torsion coil spring, and connected to a cam turning plate 17 engaged with the cam 7 to be rotatable therewith. Thus, when the brake lever is operated to pull the release wire 150 with the link 14 and brake cover 11 rigidly interconnected, the brake cover 11, cam turning plate 17 and cam 7 rotate counterclockwise against urging force G of the brake spring 12, link spring 15 and cover spring 16 as shown in FIGS. 3 and 5. As a result, cam surfaces 7a and rollers 8 press the brake shoe 10 upon the brake drum 5 to brake the bicycle.

The operating force amplifying device 200 is formed of a clamping steel ring 18 wound at least partly, e.g. twice in the illustrated embodiment, around the rear wheel hub 2 or brake drum 5 and interconnecting the link 14 and brake cover 11. When the inputting release wire 150 is pulled, the clamping ring 18 has inner surfaces thereof pressed upon the brake drum 5 to take out rotating power of the hub 2 by using frictional resistance. The rotating power thus taken out is utilized as part of an amplified operating force applied to the brake assembly 1. The clamping ring 18 is pressed upon the brake drum 5 under a pressure proportional to a primary operating force which is a pulling force applied to the release wire 150. For this purpose, the clamping ring 18 has one end thereof secured to the link 14 to act as the input section 210 noted hereinbefore, and the other end secured to the brake cover 11 to act as the output section 230, with an intermediate portion of the clamping ring 18 acting as the power takeout section 220. The power takeout section 220 has an inside winding diameter determined such that a clearance is formed between the power takeout section 220 and brake drum 5 when the brake lever is not operated at all.

According to the above construction, when the brake lever is operated to pull the release wire 150, the brake cover 11 and cam 7 are rotated counterclockwise by the force applied through the link 14 and clamping ring 18. As a result, the brake shoe 10 is pressed upon the brake drum 5 to brake the bicycle. At this time, the wound portion or power takeout section 220 of the clamping ring 18 is pressed upon the brake drum 5 to take out clockwise rotating power of the hub 2 as a frictional force which is applied as a counterclockwise rotating force to the brake cover 11. This frictional force is proportional to the pressing force of the power takeout section 220 which is substantially proportional to the primary operating force. Thus, the operating force applied to the brake lever is multiplied plural times by using the above frictional force, for transmission to the brake assembly 1 to brake the bicycle in a reliable manner. The brake force is eliminated altogether by releasing the brake lever.

Figure 7:
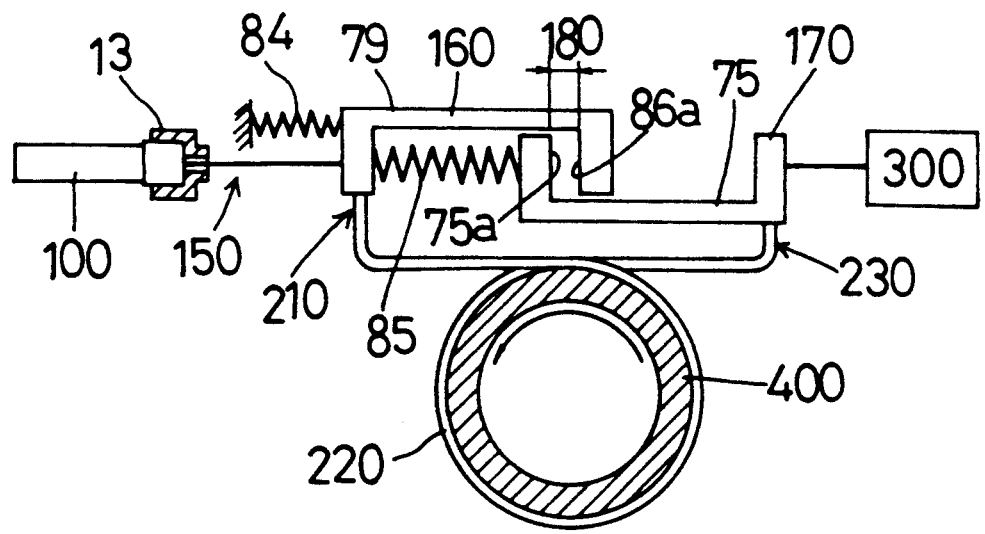
FIG. 7 is a schematic view showing the concept of an operating force amplifying and transmitting system in a second embodiment of the invention.
Figure 8:
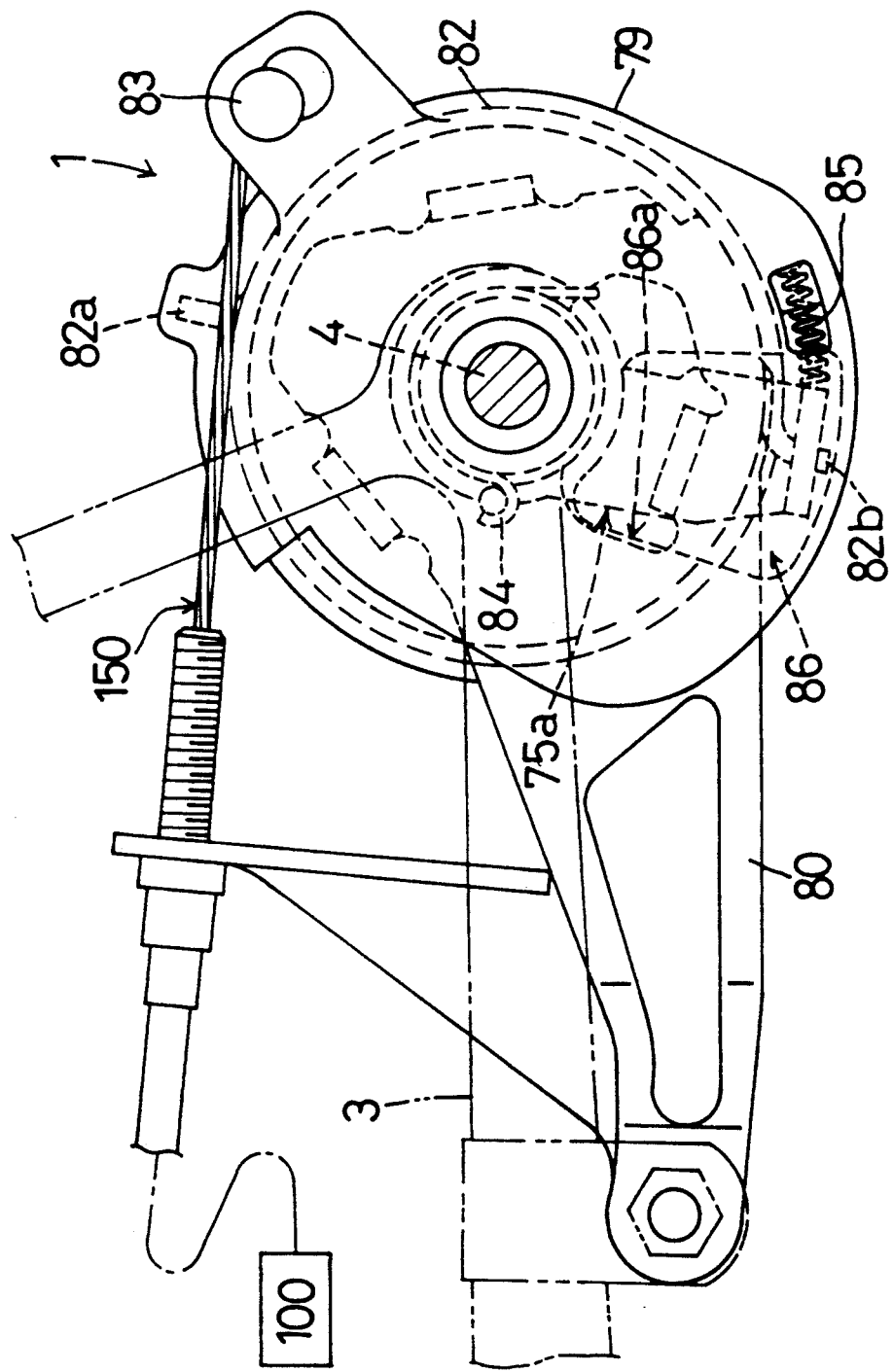
FIG. 8 is a side view of a brake assembly having an operating force amplifying device in the second embodiment.
Figure 9:
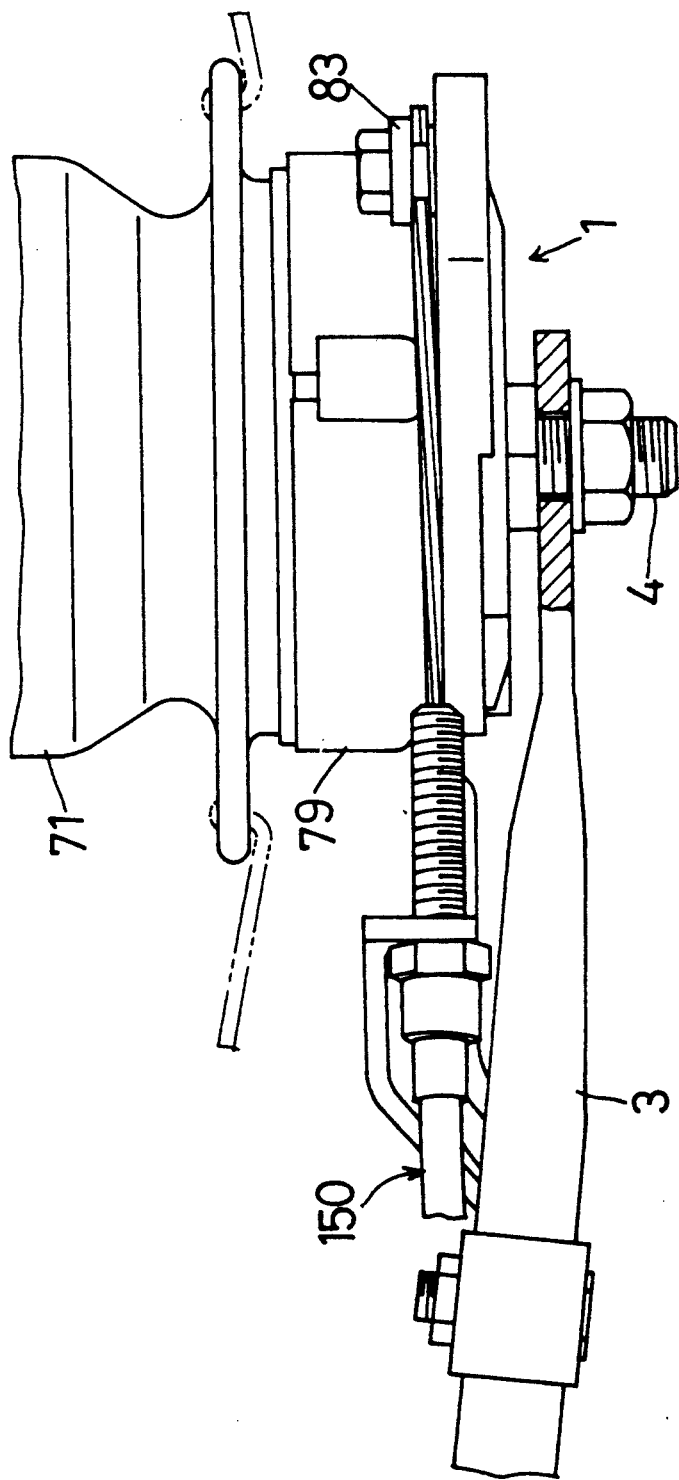
FIG. 9 is a plan view of the brake assembly in the second embodiment.
Figure 10:
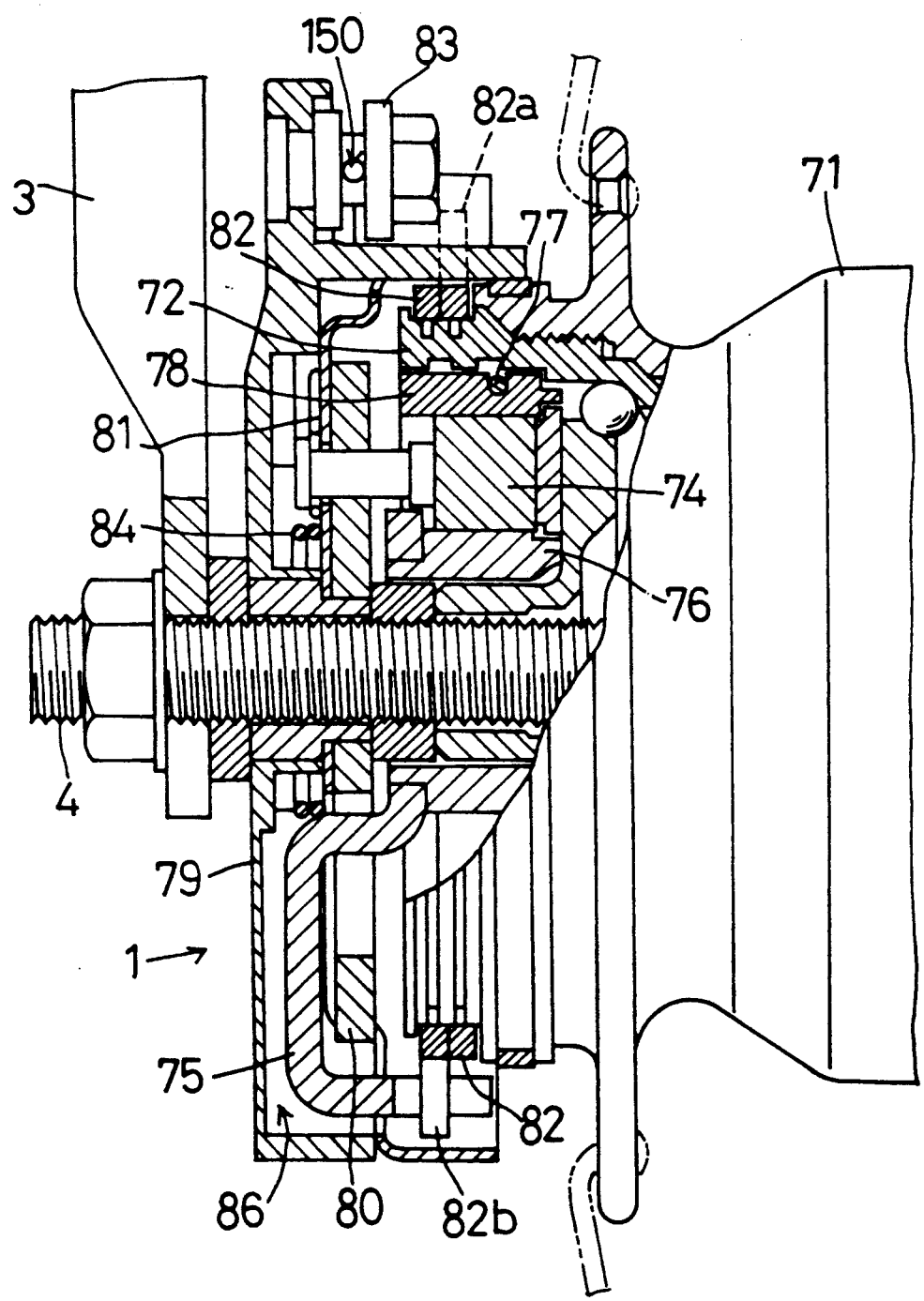
FIG. 10 is a front view, partly in section taken on a plane passing through an axle, of the brake assembly in the second embodiment.
Figure 11:
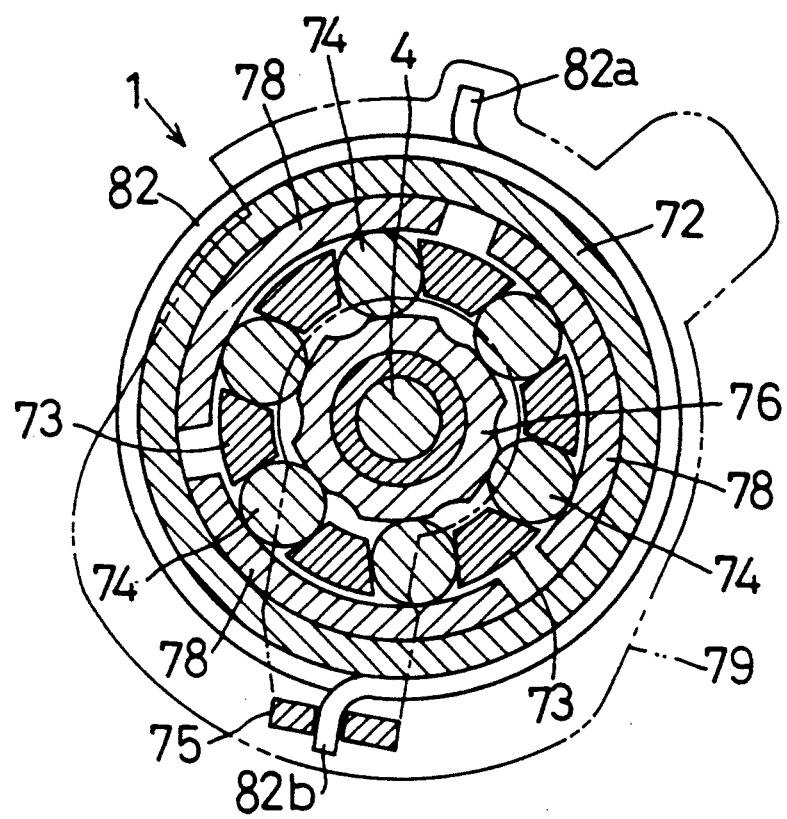
FIG. 11 is a section taken on a plane perpendicular to the axle and showing a brake drum region in the second embodiment.
Figure 12:
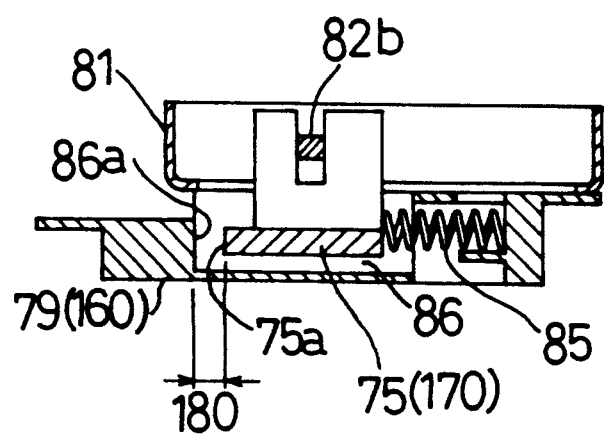
FIG. 12 is a schematic sectional view showing a space between a first bypassing connector and a second bypassing connector in the second embodiment.
Figure 13:
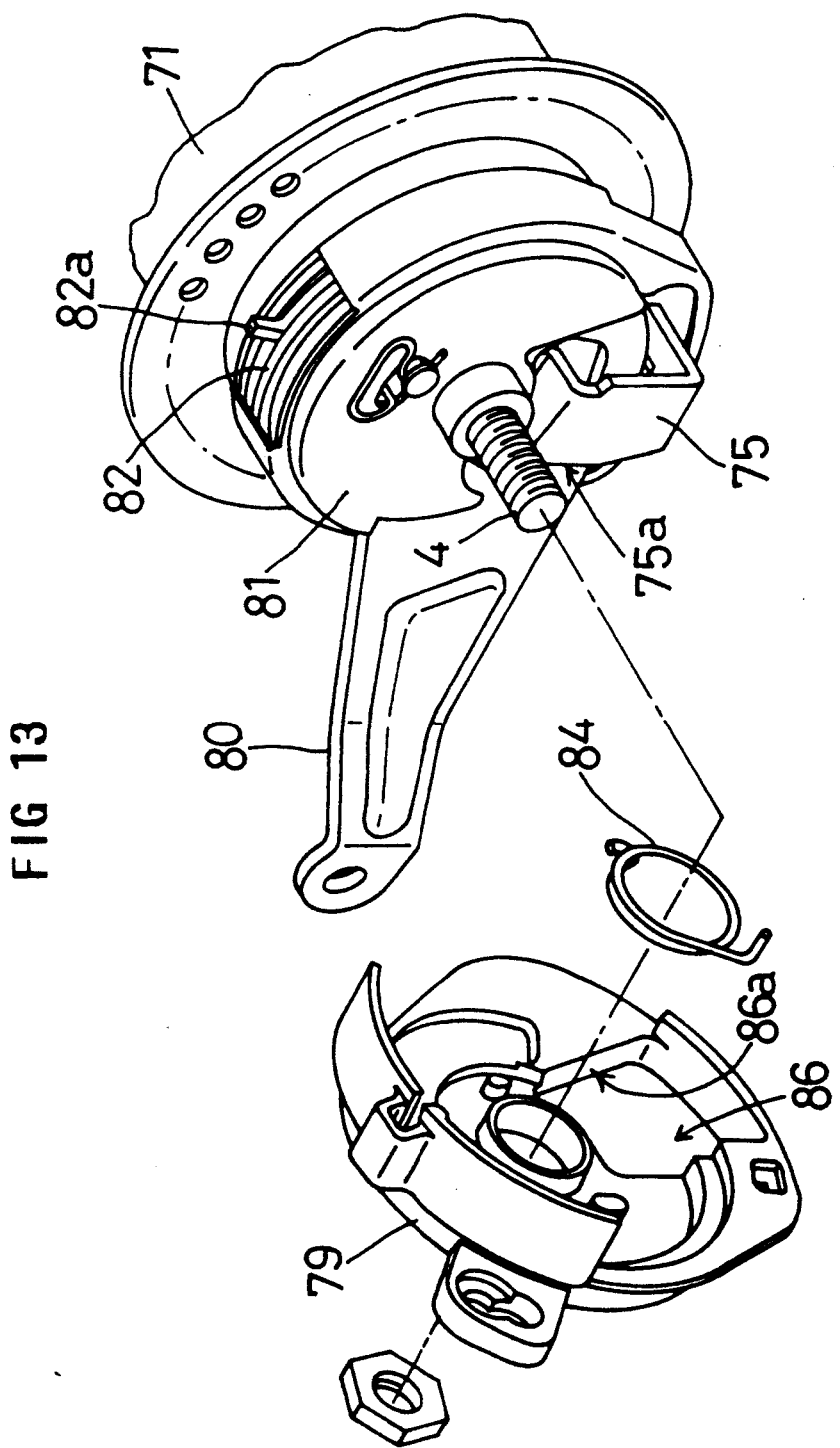
FIG. 13 is a perspective view of the brake assembly in the second embodiment.

FIG. 7 shows the principle of a second embodiment in which the present invention is applied to a brake control system. As distinct from the first embodiment, this embodiment includes a bypassing device for transmitting an operating force from the manual control device 100 to the functional device 300, bypassing the operating force amplifying device. The bypassing device includes a first bypassing connector 160 connected to the input section 210 of the amplifying device, and a second bypassing connector 170 connected to the output section 230 of the amplifying device. The first bypassing connector 160 and second bypassing connector 170 have contact ends contactable with each other when transmitting the operating force. These contact ends define a space 180 therebetween which is not closed when the operating force amplifying device is in a normal condition. As seen from FIG. 7, this space is maintained by appropriately adjusting spring loads. When the amplifying device fails, e.g. due to breaking of the power takeout section 220, the space 180 is closed by operating the control device 100 to displace the release wire 150 to a large extent. As a result, the first and second bypassing connectors are interconnected to transmit the operating force from the control device to the functional device 300.

The second embodiment of the invention will be described in detail next with reference to FIGS. 8 through 13. The functional device 300 is a bicycle brake assembly 1 similar to the brake assembly in the first embodiment, and includes an operating force amplifying device. A brake drum 72 is formed on a rear wheel hub 71 for unitary rotation about the axle 4 fixed to the bicycle frame 3. Roller 74 held in place by a roller case 73 are movable by clockwise rotation of a cam 76 engaged with a cam turning plate 75, to cause a brake shoe 78 to press upon an inside surface of the brake drum 72 against the force of a brake spring 77. A brake cover 79 is rotatably supported by the axle 4, and a waterproof cover 81 is mounted between the brake cover 79 and a stationary element 80 fixed to the bicycle frame 3.

A first clamping ring 82 acting as the power takeout section is wound around the rear wheel hub or brake drum 72. As distinct from the first embodiment, the inputting release wire 150 is fixed to the brake cover 79 by a wire holder 83, while one end 82a of the clamping ring 82 is secured to a groove formed in the brake cover 79, and the other end 82b thereof is secured to a groove in the cam turning plate 75. The brake cover 79 acts also as the first bypassing connector 160 and the input section 210 of the amplifying device. The cam turning plate 75 acts also as the second bypassing connector 170 and the output section 230 of the amplifying device. The brake cover 79 is urged clockwise in FIG. 8 relative to the stationary element 80 by a first return spring 84. The cam turning plate 75 is urge clockwise relative to the brake cover 79 by a second return spring 85. The brake cover 79 defines an inside recess 86 opposed to the wider than the cam turning plate 75. The cam turning plate 75 and recess 86 include a first contact portion 75a and a second contact portion 86a, respectively. When the clamping ring 82 is broken, the first and second contact portions 75a and 86a are placed in contact with each other to cause the cam turning plate 75 to follow counterclockwise rotation of the brake cover 79. As seen from FIG. 7, the space 18 between the first and second contact portions 75a and 86a has a size to keep the contact portions 75a and 86a out of contact with each other during a normal braking time. The contact portions 75a and 86a are contactable only when the clamping ring 82 is broken, to interconnect the brake cover 79 acting as the operating force input section and the cam turning plate 75 acting as the operating force output section, so that the brake cover 79 and cam turning plate 75 are rotatable together. In this way, the second embodiment avoids the inability to rotate the cam turning plate 75 with pulling of the wire 150, i.e. braking failure, due to breaking of the clamping ring 82 or other component.

The bypassing device in this embodiment may employ, instead of the described construction, a wire extending in a relaxed state between the input section 210 and output section 230 for directly interconnecting these sections when the clamping ring 82 is broken.

Figure 14:
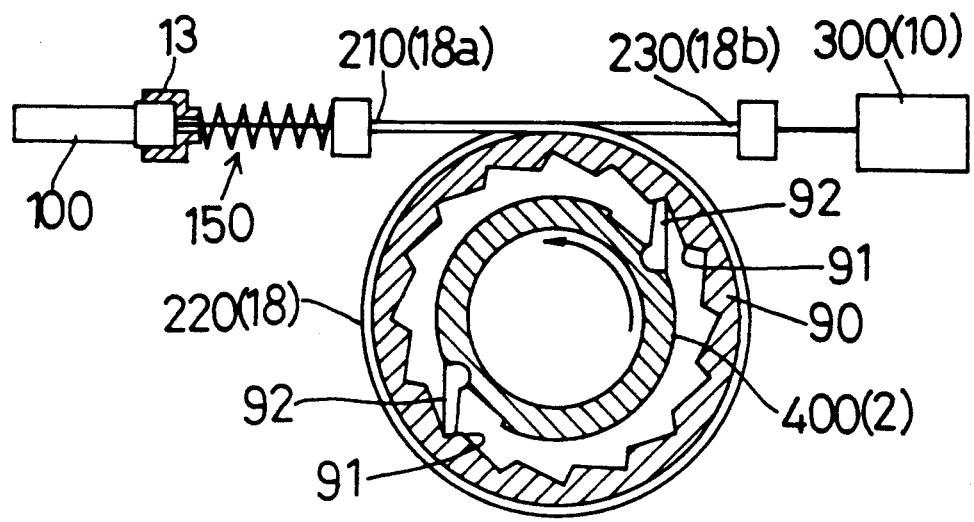
FIG. 14 is a schematic view showing the concept of an operating force amplifying and transmitting system in a third embodiment of the invention.

FIG. 14 shows the principle of a third embodiment in which the present invention is applied to a brake control system. This embodiment includes a one-way clutch device 90–92 provided between the power takeout section 220 of the amplifying device and a drive element 400. As distinct from the preceding embodiments, this one-way clutch device transmits from the drive element 400 to the power takeout section 220 only the power applied in a direction corresponding to forward drive of a bicycle. To describe this construction more particularly, although FIG. 14 illustrates a bicycle brake control system similar to the preceding embodiments, the third embodiment including a friction ring 90 rotatably mounted on the wheel hub 2 or the brake drum 5 extending from the hub 2, a first clamping ring 18 wound around the friction ring 90, and a one-way clutch for rotating the friction ring 90 only when the hub 2 is rotated forward. The one-way clutch includes ratchet teeth 91 formed on an inside surface of the friction ring 90, and ratchet pawls 92 supported by the brake drum 5 and urged for engagement with the ratchet teeth 91.

According to this construction, the one-way clutch becomes engaged when the brake drum 5 rotates forward, to rotate the friction ring 90, thereby increasing the braking force of the brake shoe 10 as in the first embodiment. On the other hand, when the brake drum 5 rotates backward, the friction ring 90 is not rotatable backward. Consequently, the braking force of the brake shoe 10 is not reduced despite the first clamping ring 18.

Figure 15:
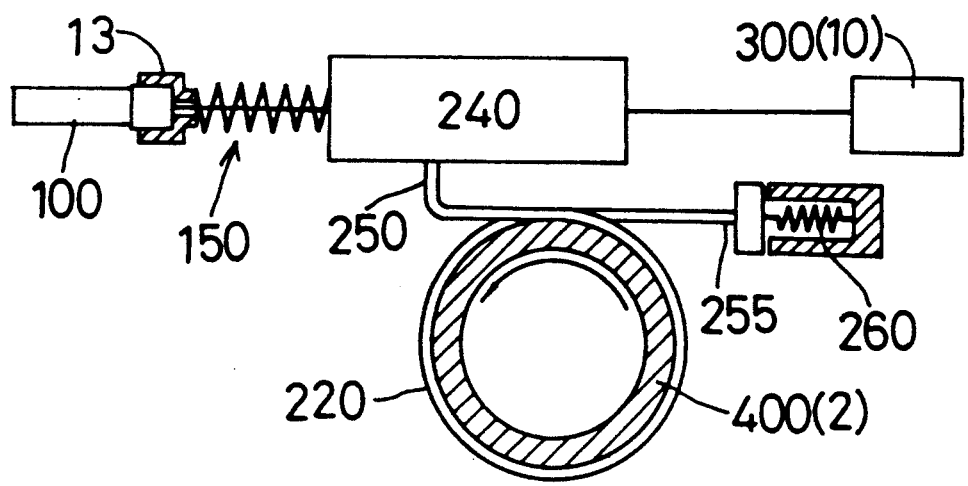
FIG. 15 is a schematic view showing the concept of an operating force amplifying and transmitting system in a fourth embodiment of the invention.

FIG. 15 shows the principle of a fourth embodiment in which the present invention is applied to a brake control system. As distinct from the preceding embodiments, the amplifying device of this embodiment has an input section and an output section formed of a common element 250. The common element 250 has one end thereof connected to a relay element 240 which drivingly interconnects the control device 100 and functional device 300, and the other end 255 fixed through a resilient element 260. To describe this construction more particularly, only one end 250 of a clamping ring 220 acting as the input section and output section of the amplifying device is connected to the relay element 240. The other end 255 of the clamping ring 220 is connected through a tension spring 260 to a stationary element. The entire clamping ring 220 is rotatable while a tension is applied to the other end 255. A portion of the clamping ring 220 adjacent the one end 250 is formed rigid not to buckle when pushing the relay element 240 as a result of friction with the wheel hub 2. The relay element 240 may be formed, for example, by directly connecting the link 14 and brake cover 11 of the first embodiment. The one end 250 of the clamping ring 220 may be secured to the brake cover 11.

According to this construction, when the hub 2 rotates forward, the clamping ring 220 presses upon the hub 2, with tension applied to the opposite ends of the clamping ring 220. The resulting frictional force increases the operating force or braking force of the brake shoe 10. Moreover, the bicycle may be braked reliably since the input section and output section of the amplifying device are directly interconnected at all times. On the other hand, when the hub 2 rotates backward, the tension spring 260 becomes relaxed to release the clamping ring 220 from the pressure contact with the hub 2. Consequently, the braking force of the brake shoe 10 is not reduced.

A fifth embodiment will be described next with reference to FIGS. 16 through 21, in which the present invention is applied to a change speed control system to amplify and transmit an operating force.

Figure 16:
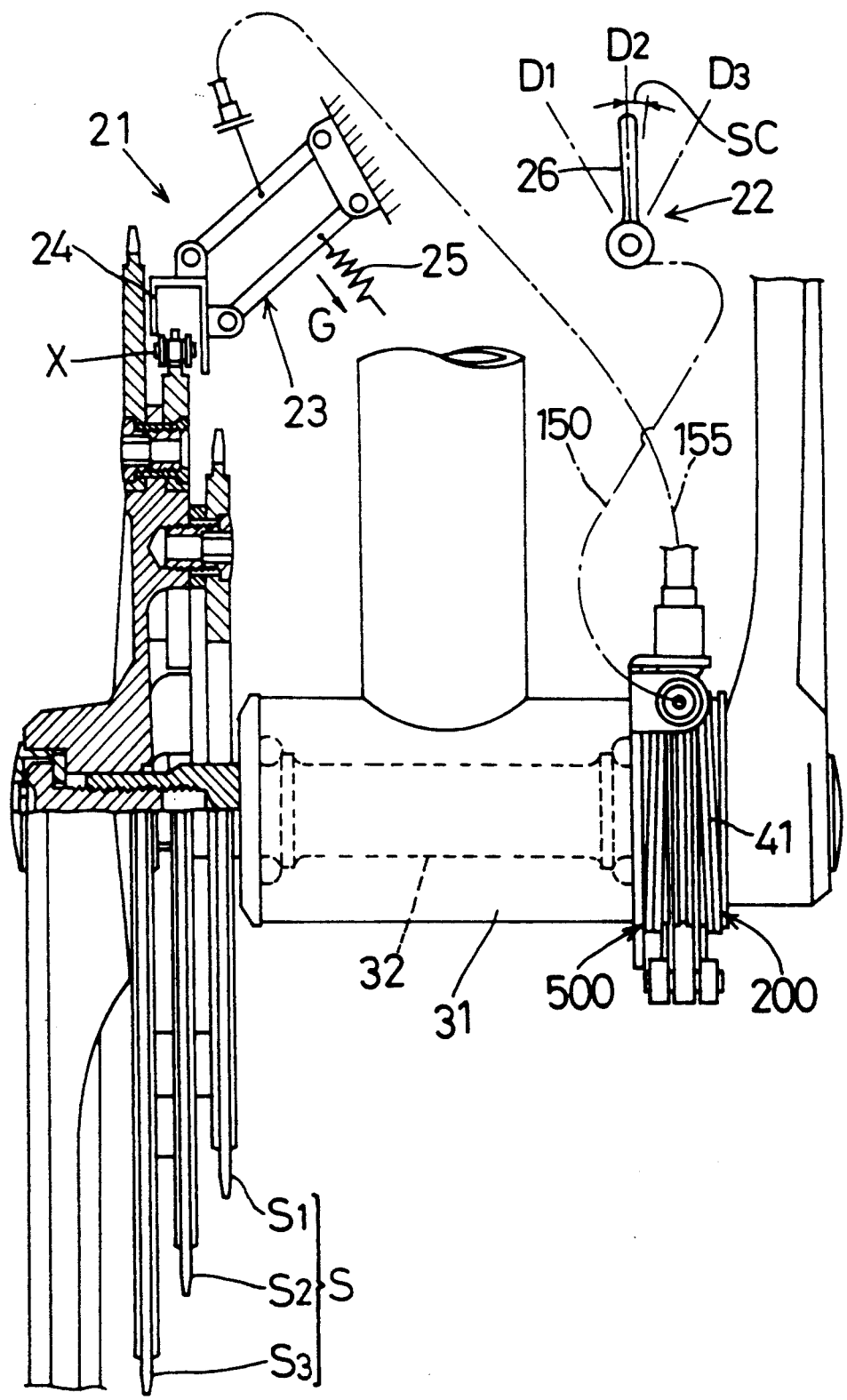
FIG. 16 is a schematic view of an operating force amplifying and transmitting system for effecting change speed in a fifth embodiment of the invention.

As shown in FIG. 16, the functional device is a bicycle derailleur (front derailleur) 21, and the control device is a change lever device 22. In this embodiment, an amplified operating force is taken from a crank shaft 32 for transmission to the functional device, and an operating force accumulator 500 is provided as described later.

The derailleur 21 schematically shown in FIG. 16 includes a four-point link 23, and a chain guide 24 attached to a free end of the link 23. The chain guide 24 is swingable to change a chain X from one to another of three gears or sprockets S1, S2 and S3 having different diameters and constituting a multi-stage sprocket device S. The chain guide 24 is constantly urged toward the small sprocket S1 by a derailleur spring 25. Change speed is made in a forward direction from small sprocket S1 toward large sprocket S3 by pulling an output wire 155 to deform the four-point link 23 against urging force G of the derailleur spring 25. Conversely, change speed in a return direction is effected by decreasing the pulling force applied through the output wire 155. The change lever device 22 includes a change lever 26 operable forward to pull an input wire 150. The change lever 26 has three drive speed positions D1, D2 and D3 arranged in stages, with a slight amount of play SC provided with respect to the wire pulling direction from each of the speed positions D1, D2 and D3.

Figure 17:
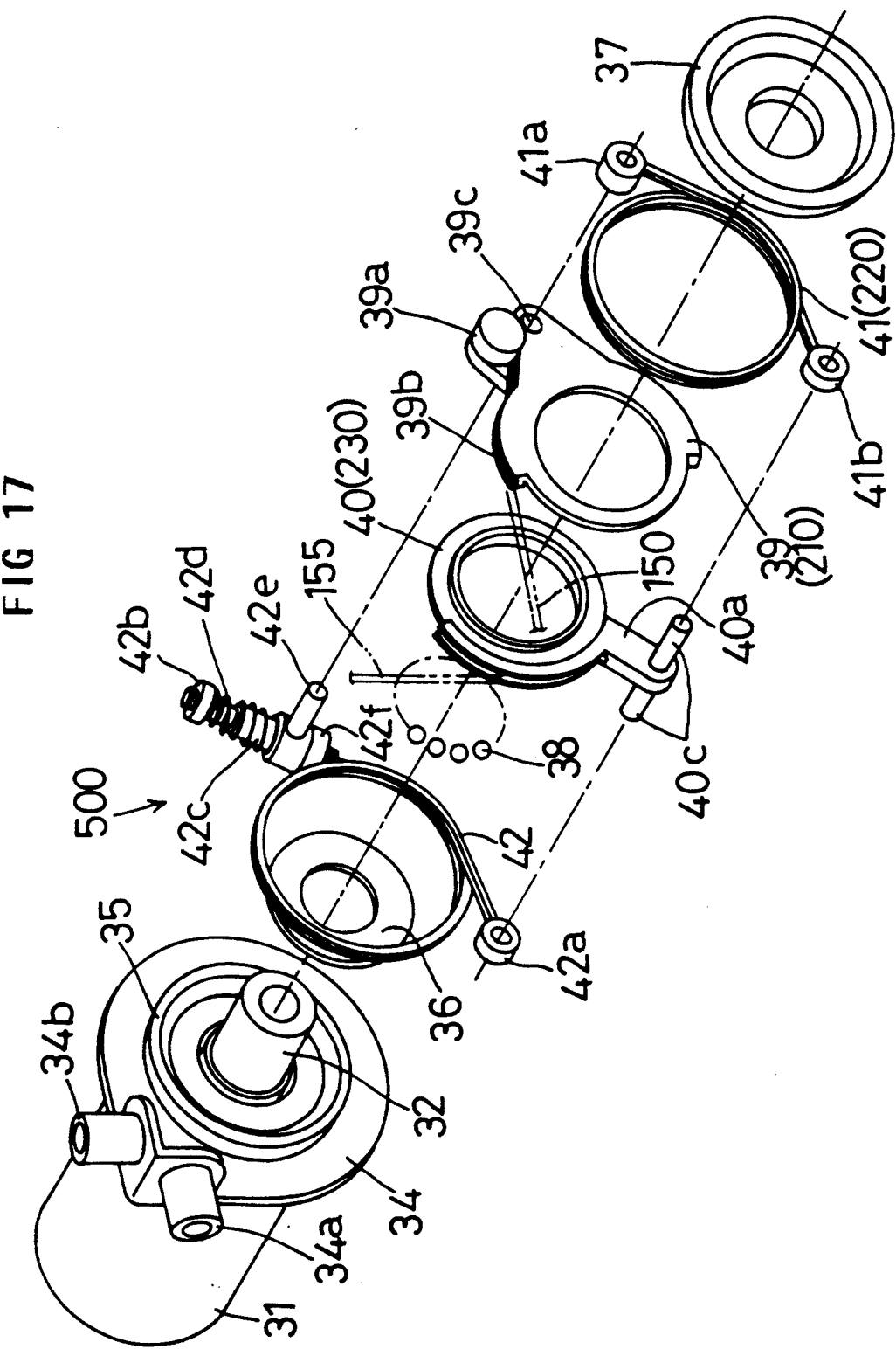
FIG. 17 is an exploded perspective view of an operating force amplifying device having an operating force accumulator in the fifth embodiment.
Figure 18:
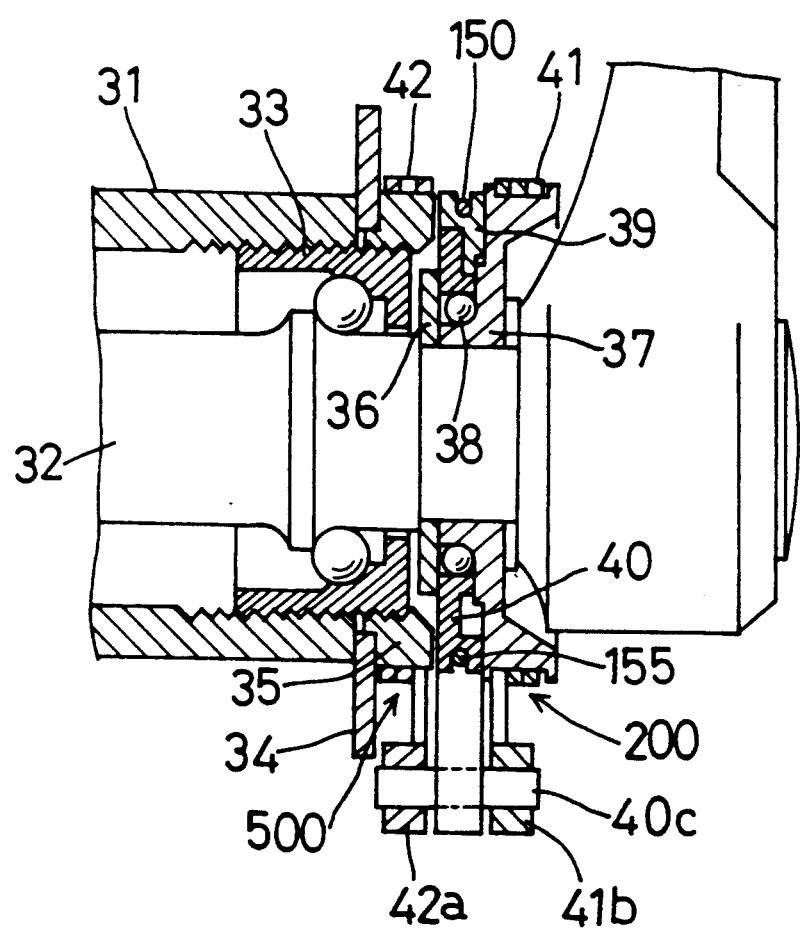
FIG. 18 is a vertical section taken along a crank shaft of the amplifying device shown in FIG. 17.

A bottom bracket 31 of the bicycle includes an operating force amplifying device 200 and the operating force accumulator 500 provided in a region thereof remote from the multi-stage front sprocket device S. Details of the amplifying device 200 and accumulator 500 are shown in FIGS. 17 and 18. The crank shaft 32 acting as a drive element 400 is rotatably supported in the bottom bracket 31 through a ball bearing 33. A stationary plate 34 and a stationary sleeve 35 are fixed to the ball bearing 33.

Figure 19:
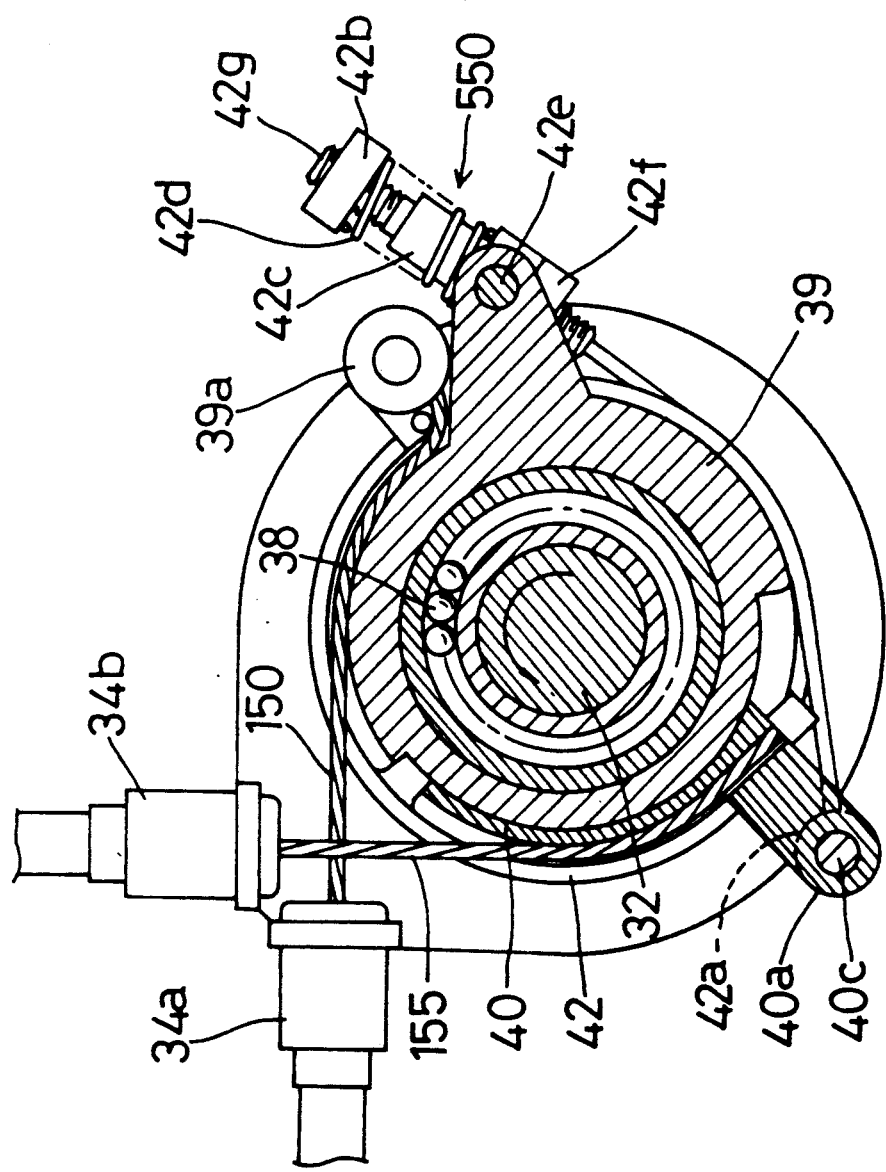
FIG. 19 is a vertical section taken in a direction perpendicular to the crank shaft of the amplifying device shown in FIG. 17.

The crank shaft 32 supports a perforated disk 36 and movable sleeve 37 both rotatable with the crank shaft 32. An operating force input element 39 acting as an input section 210 is mounted outwardly of the crank shaft 32 and between the perforated disk 36 and movable sleeve 37. The input element 39 is rotatable relative to the crank shaft 32 through a plurality of balls 38. An annular operating force output element 40 is relatively rotatably mounted on a boss of the input element 39. FIG. 19 shows a section extending radially of the input element 39. The input element 39 includes, defined peripherally thereof, a wire holder 39a connected to a free end of the input wire 150 extending from the change lever device 22, a guide groove 39b for guiding the input wire 150, and a pin hole 39c receiving an input connector pin 42e to be described later. The output element 40 includes, defined peripherally thereof, a wire hook 40a for engaging a nipple fixed to a free end of the output wire 155 extending from the derailleur 21, a guide groove 40b for guiding the output wire 155, and an output connector pin 40c. In FIG. 19, references 34a and 34b denote outer bearings fixed to the stationary plate 34 for receiving ends of outer sleeves of the input and output wires 150 and 155 formed of release wires, respectively.

The operating force amplifying device 200 is formed on substantially the same principle as in the preceding embodiments. The amplifying device 200 includes a clamping ring 41 acting as a power takeout section 220 and formed of a steel spring material wound around the movable sleeve 37, in addition to the operating force input element 39 and output element 40. The clamping ring 41 has an input member 41a and an output member 41b secured to opposite ends thereof. The input member 41a and output member 41b are connected to the input element 39 and output element 40 through the input connector pin 42e and output connector pin 40c, respectively.

The operating force accumulator 500 has a position retaining function to retain the output member 41b against movement thereof in a direction to decrease the operating force applied to the derailleur 21, and a retention canceling function to render the output member 41b movable. These functions are performed by an outer periphery of the stationary sleeve 35, an accumulator clamping ring 42 formed of spring steel and wound around this outer periphery, and a spring mechanism 550 attached to one end of the accumulator clamping ring 42. The accumulator clamping ring 42 has a connector 42a attached to the other end thereof and connected through the output connector pin 40c to the output member 41b.

Figure 20:
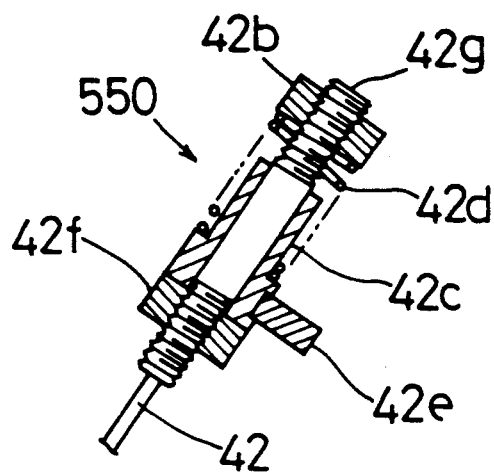
FIG. 20 is a sectional view of a spring mechanism of the accumulator shown in FIG. 17.

As shown in detail in FIG. 20, the spring mechanism 550 includes a pin 42g formed on one end of the accumulator clamping ring 42, a nut 42b engaged with a threaded portion of the pin 42g to act as a spring bearing, a slide sleeve 42c slidably mounted on the pin 42g, a release spring 42d formed of a compression coil spring extending between the nut 42b and a spring bearing formed on the slide sleeve 42c, a stopper 42f formed on the pin 42g for retaining the slide sleeve 42c on the pin 42g. The slide sleeve 42c is connected to the input element 39 through the input connector pin 42e extending from an outer periphery of the slide sleeve 42c. To assure operation of the accumulator 500, the retaining force of the accumulator clamping ring 42 produced by reaction to compression of the release spring 42d should be greater than the urging force G of the derailleur spring 25.

The way in which the operating force accumulator 500 operates will be described next. To facilitate understanding, the term "ON" will be used hereunder to describe a state in which the operating force amplifying device 200 is capable of taking out an operating force with the clamping ring 41 in sliding contact with the outer periphery of the movable sleeve 37, and a state in which the output element 40 is immovable with the release spring 42d compressed and the accumulator clamping ring 42 in sliding contact with the outer periphery of the stationary sleeve 35. Further, the term "OFF" will be used to describe a state in which the amplifying device 200 is incapable of taking out the operating force with the clamping ring 41 separated from the outer periphery of the movable sleeve 37, and a state in which the output element 40 is movable with the release spring 42d extended to contact the stopper 42f and the accumulator clamping ring 42 separated from the outer periphery of the stationary sleeve 35.

Figure 21:
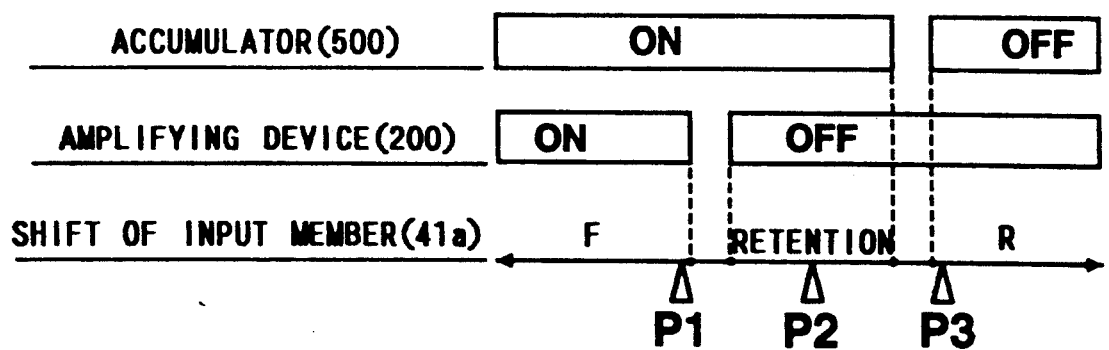
FIG. 21 is an explanatory view showing operating states of the amplifying device in the fifth embodiment.

FIG. 21 shows states of the amplifying device 200 and operating force accumulator 500 corresponding to positions of the input member 41a (which are limited to a range between point P1 and point P3 since the output and input members will revolve together when the input member 41a is outside this range).

To effect change speed forward against the urging force G of the derailleur 21, the change lever device 22 is operated forward to apply a pulling force to the input wire 150. This rotates the operating force input element 39 counterclockwise, which in turn causes the operating force output element 40 through the clamping ring 41 to rotate counterclockwise. At this time, the clamping ring 41 is contracted to place the amplifying device in the "ON" state. The rotating power of the movable sleeve 37 rotating with the crank shaft 32 acting as the drive element 400 (which rotates counterclockwise when the bicycle is pedaled) is taken out through the friction, and transmitted as power to rotate the output element 40 counterclockwise, i.e. power to pull the output wire 155 and move the chain guide 24 of the derailleur 21 toward the large gear. Thus, the change speed operation may be effected with a light lever touch. At the same time, the position retaining function of the accumulator 500 is "ON" with compression of the release spring 42d and contraction of the accumulator clamping ring 42. Since the accumulator clamping ring 42 is in the form of a coil spring, its one-way transmission characteristic presents no obstacle to the operation of the change lever 26 (point P1 in FIG. 21).

When the change lever 26 is released, the change lever 26 returns by the amount of play SC to slightly relax the pulling force applied to the input wire 150. Then the clamping ring 41 is turned "OFF". However, the accumulator clamping ring 42 remains contracted under the force of the release spring 42d, hence the accumulator 500 remains "ON" (point P2 in FIG. 21, which corresponds to one of the positions D1-D3). That is, the output member 41b is retained by the friction against clockwise rotation, whereby the chain guide 24 stands still instead of moving backward. In this way, the chain guide 24 is retained in position after the change speed operation, and the crank shaft 32 is freed from the clamping ring 41 to become rotatable.

To effect change speed backward by using the urging force of the derailleur spring 25, the change lever device 22 is operated further backward to further relax the pulling force applied to the input wire 150 (point P3 in FIG. 21). Then the accumulator clamping ring 42 is relaxed to place the accumulator 500 in the "OFF" state and release the output member 41b. The output element 40 rotates clockwise to rewind the output wire 155 under the force of the derailleur spring 25. Thus, the chain guide 24 returns toward the small gear. The change speed operation in the backward direction is completed when the accumulator clamping ring 42 is contracted to place the accumulator 500 in the "ON" state again, and the clamping ring 41 and accumulator clamping ring 42 stop rotating together.

Figure 22:
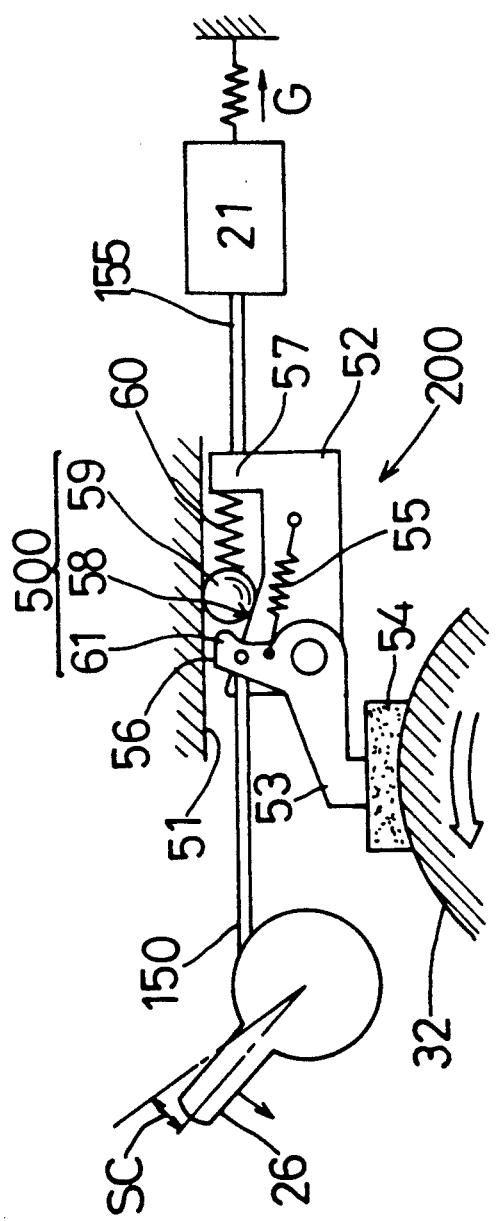
FIGS. 22, 23 and 24 are schematic views showing operation of an operating force amplifying and transmitting system for effecting change speed in a sixth embodiment of the invention.
Figure 23:
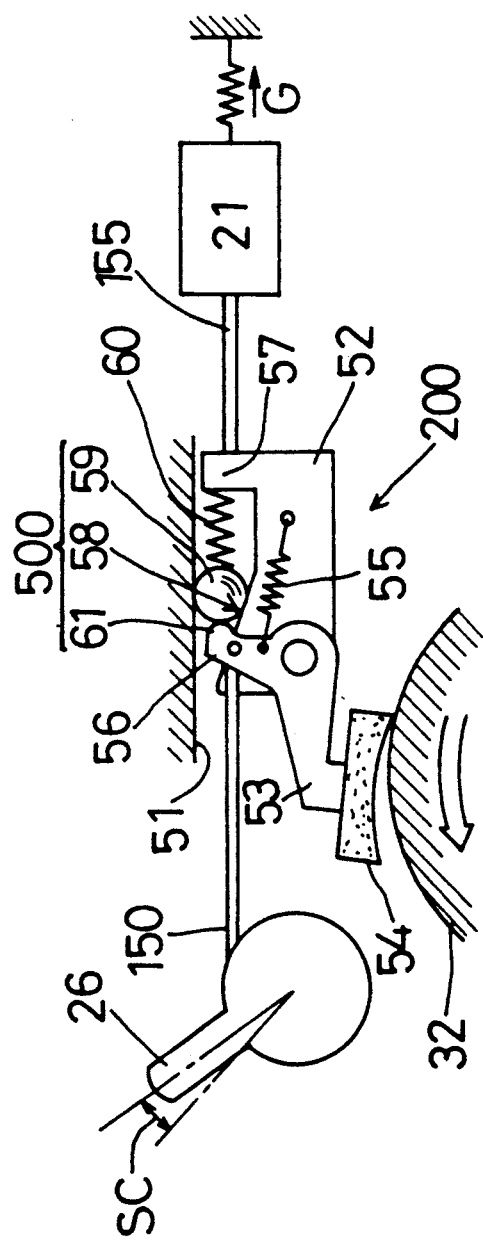
Figure 24:
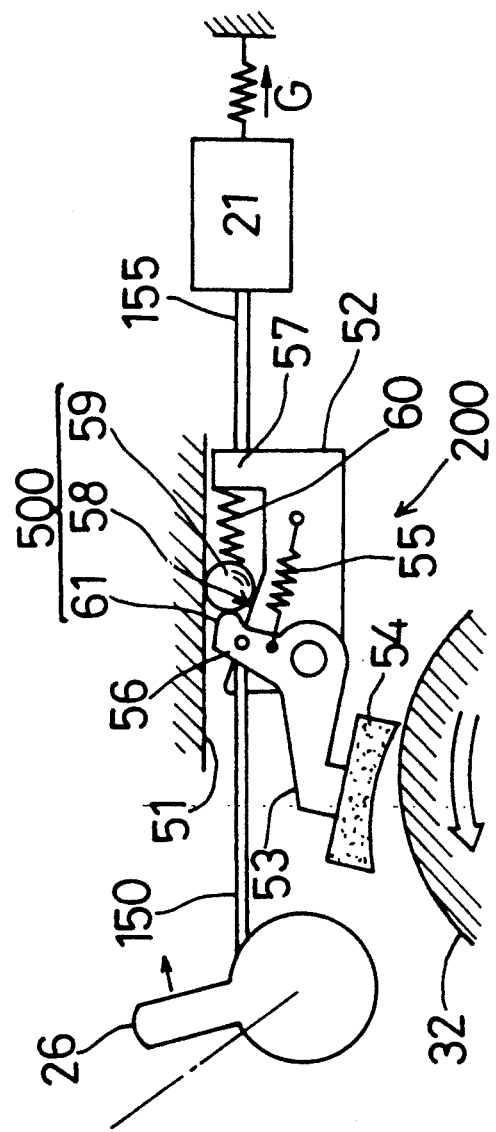

A sixth embodiment will be described next with reference to FIGS. 22 through 24, in which the present invention is applied to a change speed control system to amplify and transmit an operating force as in the fifth embodiment.

In this embodiment also, an amplified operating force is taken from a crank shaft 32 acting as a drive element 400 for transmission to a front derailleur 21. The operating force amplifying device 200 includes a main power takeoff body 52 spaced from and movable along a stationary surface 51 fixed to a bicycle frame, a takeout lever 53 pivoted to the main body 52, a power takeout shoe 54 secured to the takeout lever 52 and movable into sliding contact with an outer periphery of the crank shaft 32, a lever spring 55 for urging the takeout shoe 54 away from the crank shaft 32. In practice, the stationary surface 51 may be formed arcuate about the crank shaft 32, but is shown as a flat surface for expediency of illustration. The takeout lever 53 includes an operating force input element 56 for securing an input wire 150 thereto, while the main body 52 includes an operating force output element 57 for securing an output wire 155 thereto. The operating force accumulator 500 includes a sloping surface 58 defined on the main body 52 and inclined away from the stationary surface 51 in a direction to relax the output wire 155, and a ball 59 press fit between the sloping surface 58 and stationary surface 51 to prevent the main body 52 from moving relative to the stationary surface 51 in the direction to relax the output wire 155. The ball 59 is slightly urged by a ball spring 60 against the sloping surface 58. The takeout lever 53 includes a ball pushing projection 61 for pushing the ball out of the press fit on the sloping surface 58 when the takeout lever 53 is turned in a direction to separate the takeout shoe 54 from the crank shaft 32.

The way in which the sixth embodiment operates will be described next.

For effecting change speed from the small gear toward the large gear, a pulling force is applied to the input wire 150. Then, the takeout lever 53 is turned counterclockwise against the urging force of the lever spring 55, to move the takeout shoe 54 into sliding contact with the outer periphery of the crank shaft 32. In this way, as in the fifth embodiment, an operating force is produced to move the chain guide 24 of the derailleur 21 toward the large gear. When the change lever 26 is released to return by the amount of play SC, the ball 59 is press fit between the sloping surface 58 and stationary surface 51, to maintain the chain guide 24 in place after the change speed operation and to separate the takeout shoe 54 from the crank shaft 32.

For effecting change speed from the large gear toward the small gear, the change lever 26 is operated further backward to move the ball pushing projection 61 into contact with the ball 59. Then, the urging force of the lever spring 55 prevails over that of the ball spring 60, and releases the ball 59 from the press fit, compressing the ball spring 60. The main body 52 moves in the direction to relax the output wire 59 under the force of the derailleur spring, whereby the chain guide 24 moves toward the small gear to effect the change speed in the backward direction. The chain guide 24 is maintained in place after the change speed operation with the ball 59 press fit again between the sloping surface 58 and stationary surface 51.

The following modifications may be made to the various embodiments described hereinbefore:

(1) In the foregoing embodiments, the brake drum extending from the wheel hub or the element connected to the crank shaft is used as the drive element 400. However, a separate element driven by the wheel hub or crank shaft may be used instead.

It is also possible to use as the drive element the chain X or other component that makes a linear motion instead of the rotatable component.

(2) The "functional device" and "manual device" in the present invention are not limited to the brake device, derailleur, brake lever, change lever and so on described in the embodiments. The control or functional device may be a disk brake device or a stepless change speed device having a different construction, or some other device that has a function totally different from braking or change speed.

(3) The operating force accumulator 500 is variable in many ways instead of being limited to the friction-held construction as in the fifth embodiment and the construction employing the press fit ball 59 as in the sixth embodiment. The accumulator may be formed of a ratchet pawl and a plurality of teeth engageable with the pawl, for example.

What is claimed is:

1. In a bicycle having functional means operable by operating force output from a manual control means, a system amplifying the operating force for transmission to the functional means, said system comprising:
 an input section for receiving the operating force output from the manual control means;
 power takeout means for taking out the power from a wheel hub based on the force received by said input section, said power takeout means being wound around at least part of said hub, said power takeout means being engageable with said hub as a result of an increase in tension of said power takeout means, to take out the power through a frictional resistance produced by the engagement; and
 an output section for transmitting the power to said functional means.

2. A system as claimed in claim 1, wherein a one-way clutch means is provided between said power takeout means and said wheel hub for allowing said power takeout means to take from said wheel hub only power acting in a direction corresponding to a forward driving direction of the bicycle.

3. A system as claimed in claim 2, wherein said one-way clutch means is a ratchet-pawl one-way clutch provided peripherally of said wheel hub, and said power takeout means is wound around at least part of an outer periphery of said one-way clutch means, said power takeout means being engageable with said outer periphery as a result of an increase in tension of said power takeout means, to take out power acting in one direction of said hub, through a frictional resistance produced by the engagement.

4. A system as claimed in claim 1, wherein said manual control means is a brake lever device, and said functional means is a brake device for acting on at least one wheel of said bicycle.

5. A system as claimed in claim 1, wherein said manual control means is a change speed lever device, and said functional means is change speed device for changing the speed of said bicycle.

6. In a bicycle having a brake device operable by an operating force output from a brake lever device, said brake device including a brake drum extending from a wheel hub and a roller brake mechanism disposed coaxially with an axle, said roller brake mechanism including:
 a) a cam rotatable about an axis of said axle,
 b) a plurality of rollers displaceable with rotation of said cam,
 c) a roller case for displaceably retaining said rollers, and
 d) a brake shoe disposed between said rollers and said brake drum for contacting said brake drum upon displacement of said rollers,
 a system for amplifying the operating force from the brake lever device for transmission to the brake device, said system comprising:
 a wire for transmitting an operating force of said brake lever device; and
 a clamping ring having a first end thereof operatively connected to said wire for receiving the operating force of said brake lever device, and a second end operatively connected to said cam, and an intermediate portion wound at least partially around a peripheral surface of said brake drum for taking out power from said brake drum upon engagement of said intermediate portion with said drum caused by tension in said clamping ring produced by said wire in response to the operating force of said brake lever device.

7. A system as claimed in claim 6, wherein bypass means is provided between said first end of the clamping ring and said cam for transmitting the operating force to said cam based on a displacement of said wire which exceeds a predetermined amount.

8. A system as claimed in claim 7, wherein said bypass means includes a first bypass connector connected to said first end of the clamping ring, and a second bypass connector connected to said second end of the clamping ring, said first bypass connector and said second bypass connector including contact portions, respectively, which are contactable with each other to transmit an operating force to said cam, said contact portions being urged by springs to define a gap between them, said gap being closed when the displacement of said wire exceeds said predetermined amount.

9. In a bicycle having a derailleur operable by an operating force of a change speed lever device, a system for amplifying the operating force from the change speed lever device for transmission to said derailleur, said system comprising:
    a first change speed wire for transmitting the operating force output from said change speed lever device;
    power takeout means for taking the power from a crank shaft of said bicycle based on the operating force transmitted through said first change speed wire; and
    a second change speed wire for transmitting the power taken out by said power takeout means to said derailleur.

10. A system as claimed in claim 9 further comprising an operating force accumulator for temporarily accumulating the power taken out by said power takeout means.

11. A system as claimed in claim 10, wherein said power takeout means is disposed coaxially with said crank shaft and includes:
    a) a rotary disk interlocked with said crank shaft,
    b) a stationary disk;
    c) an input ring connected to said first change speed wire and rotatably supported by said crank shaft,
    d) an output ring connected to said second change speed wire and rotatably supported by said crank shaft, and
    e) a clamping ring wound around a peripheral surface of said rotary disk to act as said power takeout means, and having one end thereof connected to said input ring and the other end connected to said output ring.

12. A system as claimed in claim 11, wherein said operating force accumulator includes an accumulator ring wound around a peripheral surface of said stationary disk, and having one end thereof connected to said output ring and the other end connected to said input ring through a spring mechanism.

13. A system as claimed in claim 12, wherein said spring mechanism includes a slide pin connected to said input ring and a spring stopper, a bush defining a slide bore for receiving said slide pin and having a spring bearing, and a compression spring mounted on said slide pin between said spring bearing and said spring stopper, said bush being pin-connected to said input ring.

14. A system as claimed in claim 10, wherein said operating force accumulator includes a wedge mechanism having a spring-loaded wedge and a sloping surface engageable with said wedge, said wedge mechanism being maintained in a displaced position by a frictional force produced by engagement between said wedge and said sloping surface based on a positive operating force applied from said change speed lever device, said wedge being movable out of the engagement by a negative operating force applied from said change speed lever device.

15. In a bicycle having a brake device operable by an operating force output from a brake lever device, a system for amplifying the operating force for transmission to the brake device, said system comprising:
    a first transmission member for transmitting an operating force output from said brake lever device;
    means for taking out the power from a wheel hub of the bicycle based on the force transmitted through said first transmission member; and
    a second transmission member for transmitting the power taken out from said power takeout means to said brake device.

16. In a bicycle including functional means operable by an operating force of a manual control means, a system for amplifying the operating force for transmission to said functional means, said system comprising:
    a first transmission member for transmitting the operating force output from the manual control means;
    an input section for receiving the force transmitted through said first transmission member;
    a rotary member driven upon operation of the bicycle;
    power takeout means for taking out the power from said rotary member based on the force received by said input section, said power takeout means being wound around at least part of said rotary member, said takeout means being engageable with said rotary member to take out the power as a result of an increase in tension of said power takeout means; and
    an output section for transmitting the power taken out from said power takeout means to said functional means.

17. A system as claimed in claim 16 further comprising bypass means for bypassing said power takeout means to transmit the operating force from said manual control means directly to said functional means.

18. A system as claimed in claim 17, wherein said bypass means includes a first bypass connector connected to said input section, and a second bypass connector connected to said output section, said first bypass connector and said second bypass connector including contact portions, respectively, which are contactable with each other after said transmission member is displaced by a predetermined amount to transmit operating force to said output section, said contact portion defining a gap therebetween corresponding in size to said predetermined displacement amount.

19. A system as claimed in claim 18, wherein said gap is maintained open by a spring urging force.

20. A system as claimed in claim 16, wherein said power takeout means includes a belt-like member for pulling force and compression force transmission, said belt-like member having one end thereof connected to said input section and output section and the other end thereof fixed through an elastic member.

* * * * *